Feb. 7, 1950 N. LESSER 2,496,399
INDUSTRIAL TRUCK
Filed April 1, 1946 3 Sheets-Sheet 1
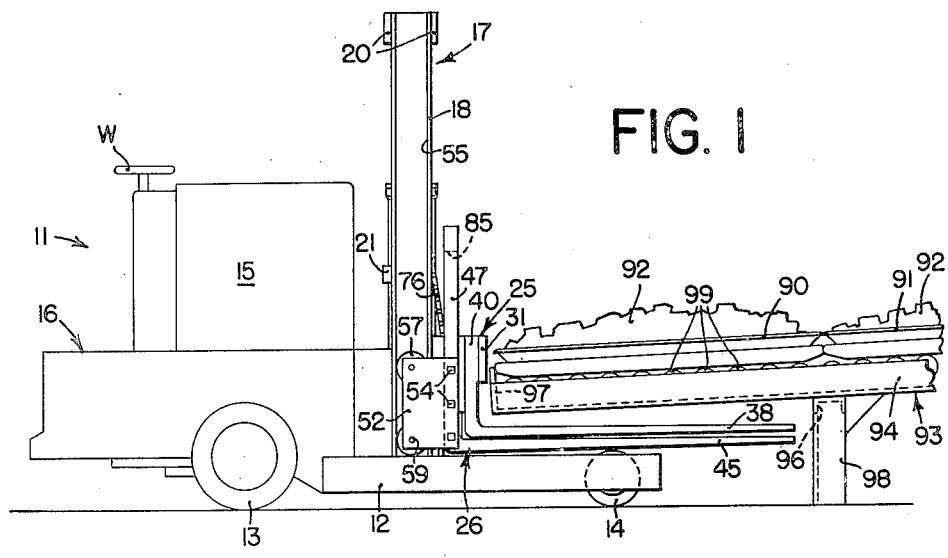
FIG. 1
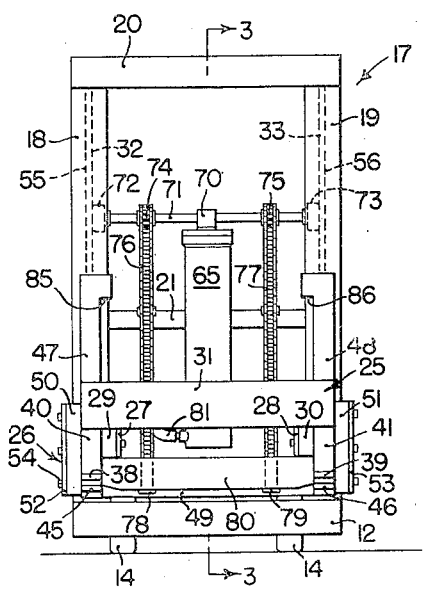
FIG. 2
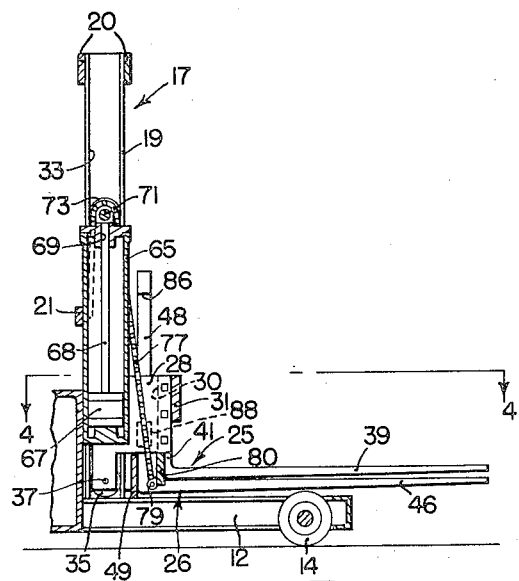
FIG. 3
*INVENTOR.*
NATHAN LESSER
ATTORNEYS Feb. 7, 1950            N. LESSER            2,496,399

INDUSTRIAL TRUCK

Filed April 1, 1946            3 Sheets-Sheet 2

INVENTOR.
NATHAN LESSER
BY
ATTORNEYS

Feb. 7, 1950      N. LESSER      2,496,399
INDUSTRIAL TRUCK
Filed April 1, 1946      3 Sheets-Sheet 3
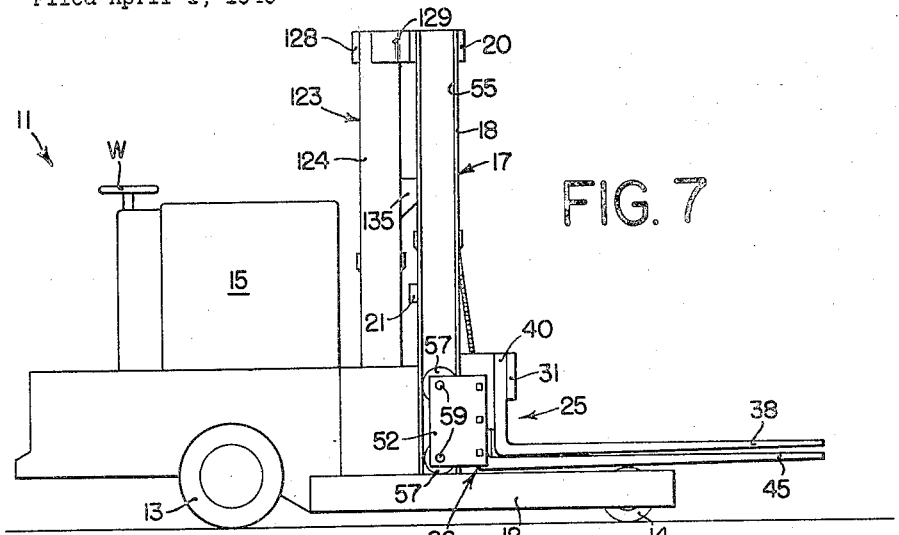
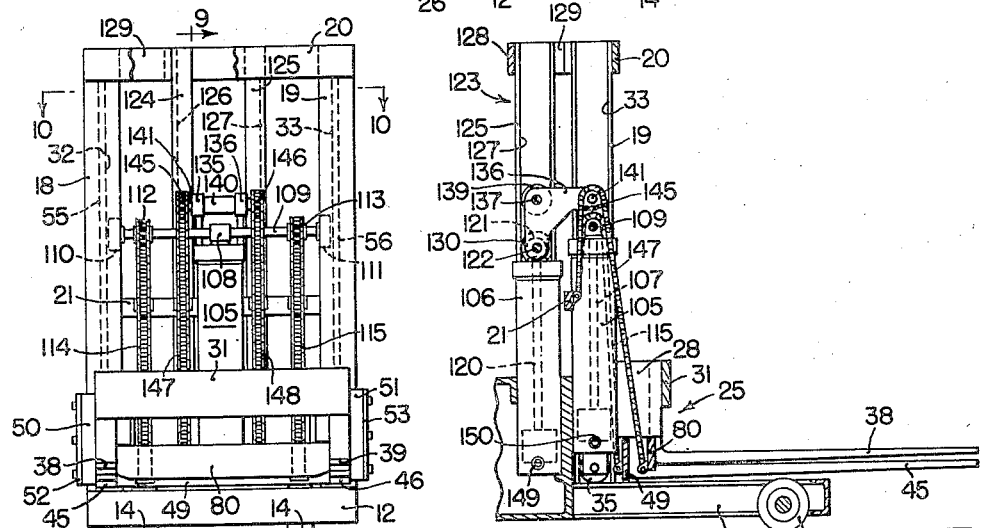
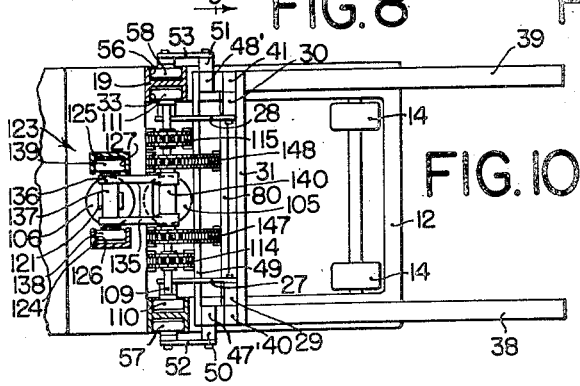
*INVENTOR.*
NATHAN LESSER
ATTORNEYS Patented Feb. 7, 1950

2,496,399

UNITED STATES PATENT OFFICE 2,496,399

INDUSTRIAL TRUCK

Nathan Lesser, Moline, Ill., assignor to Deere & Company, Moline, Ill., a corporation of Illinois Application April 1, 1946, Serial No. 658,708

8 Claims. (Cl. 187—9)

The present invention relates generally to industrial trucks and more particularly to trucks of the type used in industrial plants for transporting materials and manufactured products within the plant. One common use of this type of truck is to transport trays of castings or other small parts from a conveyor in one building to a conveyor or possibly a storage warehouse in another part of the plant, and frequently the nature of the pieces carried in the trays is such that the trays cannot be stacked one upon the other during the transport operation. Consequently, heretofore it has been necessary to carry but one tray of parts at a time, with the result that the trucks are used to carry loads which are far below their capacity.

One of the principal objects of the present invention, therefore, relates to the provision of a truck which can be efficiently loaded with trays which can be carried and handled separately without the necessity for piling the trays one upon the other. More specifically, it is an object of the present invention to provide a truck having a plurality of load-carrying platforms or lifting forks, which can be lifted separately to pick up a plurality of separate loads without interference between one load and another. Still another object relates to the provision of a truck having a vertical guide frame, on which is mounted a pair of upper and lower lifting members or forks, which can be raised one at a time to pick up one tray of castings or the like, lift it to an elevated position, and then pick up the second load on the lower fork.

A further object relates to the provision of a truck having a pair of separate lifting members, which can be raised successively by a single power actuated lifting device. In this embodiment of my invention, the lifting device, which is preferably a hydraulic cylinder, although it is not intended to limit the invention to the latter, is connected to one of the lifting members and operates through a portion of its range of movement to lift this member without moving the other member. When the first member has reached a certain elevation, the second lifting member is picked up by a lost motion connection between the two members, whereby both lifting members are raised simultaneously throughout the remaining portion of the range of movement of the lifting device.

Still another object of my invention relates to the provision of a truck having a pair of independently movable lifting members, such as forks or platforms, which are provided with independent lifting devices, such as, for example, hydraulic cylinders, thereby providing for picking up a load with one of the lifting forks and raising it throughout the entire range of lifting movement before the second load is lifted.

These and other objects and advantages of my invention will be apparent to those skilled in the art after a consideration of the following description, in which reference is had to the drawings appended hereto, in which Figure 1 is a side elevational view showing an industrial truck embodying the principles of the present invention, in a position in which it is ready to lift a tray of material, manufactured parts, or the like from the end of a roller type conveyor;

Figure 2 is a front elevational view of the industrial truck;

Figure 3 is a sectional elevational view of a portion of the truck taken along a line 3—3 in Figure 2 and showing the lifting mechanism;

Figure 7 is a side elevational view of an industrial truck showing a modified form of my invention in which two lifting forks are provided, each having its individual lifting mechanism;

Figure 8 is a front elevational view of the truck shown in Figure 7;

Figure 9 is a sectional elevational view of the forward portion of the truck showing the lifting mechanism, taken in section along a line 9—9 in Figure 8; and Figure 10 is a sectional plan view taken along a line 10—10 in Figure 8 and showing the portion of the truck which includes the lifting mechanism.

Figure 5:
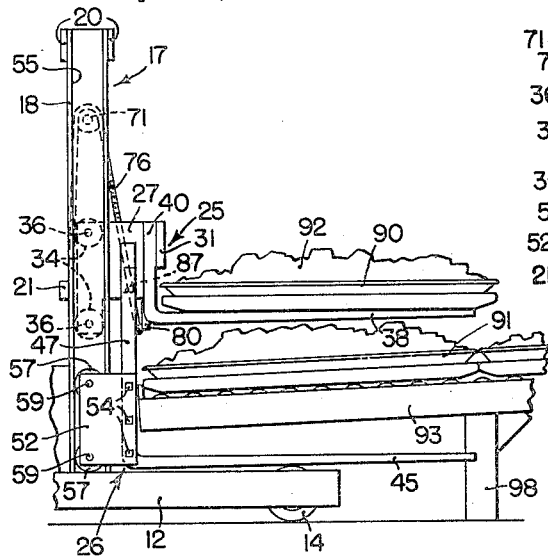
Figure 5 is a side elevational view of the forward portion of the truck showing the lifting mechanism in a position in which the first tray of material has been lifted on one lifting fork and the second tray of material has been moved to the end of the conveyor, preparatory to being lifted by the second lifting fork.
Figure 6:
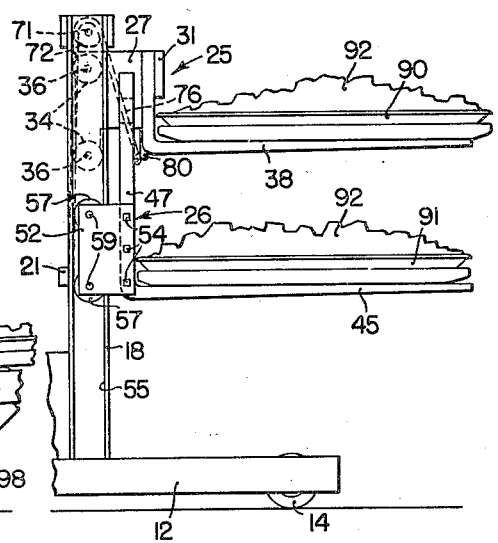
Figure 6 is a side elevational view of the lifting mechanism showing the truck in transport position with two loaded trays supported on the two forks, respectively.
Figure 4:
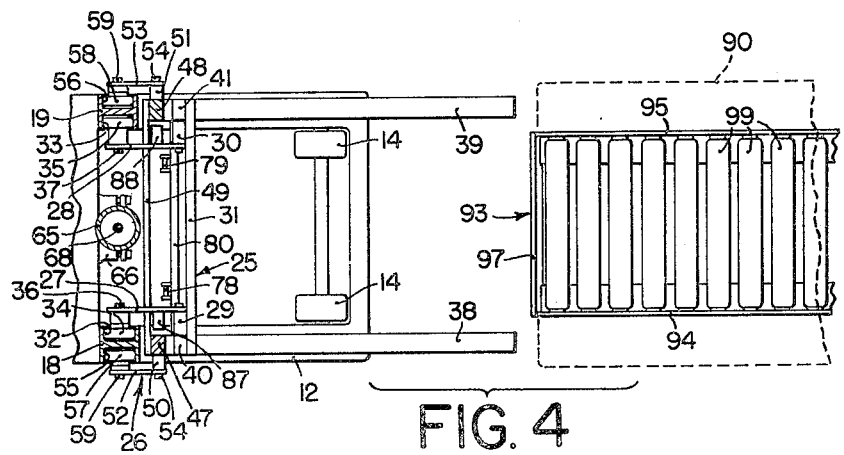
Figure 4 is a plan view taken in section along a line 4—4 in Figure 3 showing the lifting mechanism at the forward portion of the truck and also showing a portion of the roller conveyor ahead of the truck.

Referring now to the drawings, and more particularly to Figures 1-6, inclusive, the industrial truck is indicated in its entirety by reference numeral 11 and comprises a generally horizontal chassis or frame 12 carried on a pair of laterally spaced rear traction wheels 13 and a pair of comparatively smaller front wheels 14. The rear end of the truck is provided with a housing 15, in which is enclosed the power plant and the controls for the truck and for its lifting mechanism, as is well known to those skilled in the art, and which is omitted from this description in the interest of simplicity, since the present invention is not concerned with the details of the propelling mechanism. The operator's station is indicated at 16 behind the power plant housing 15, from which station the truck is guided by means of a steering wheel W connected to steer the truck through the rear wheels 13 in a conventional manner.

Intermediate the front and rear wheels 14, 13 is positioned a generally vertically disposed guide frame 17, which comprises a pair of laterally spaced upright I-beams 18, 19, the lower ends of which are carried by the chassis 12 and the upper ends of which are interconnected by a pair of transverse tie beams 20 and a lower interconnecting beam 21 extending transversely between the I-beams 18, 19.

A pair of upper and lower lifting members 25, 26 are mounted on the upright frame 17 by means providing for generally vertical shifting movement of each of the lifting members relative to the frame. The upper member 25 comprises a carriage including a pair of laterally spaced plates 27, 28 secured to a pair of blocks 29, 30, respectively, which are interconnected by a transversely extending front plate 31 secured rigidly to the forward sides of the two blocks 29, 30. The plates 27, 28 extend rearwardly between the two I-beams 18, 19 and adjacent the inner sides of the latter, respectively. The channels 32, 33 extending longitudinally along the inner sides of the I-beams 18, 19 serve as vertical guideways for two pairs of vertically spaced carriage supporting wheels 34, 35. One pair of vertically spaced wheels 34 is journaled on trunnions 36 extending outwardly from the plate 27, the wheels 34 being disposed within the channel 32. The other pair of vertically spaced wheels 35 are journaled on a pair of trunnions 37 extending outwardly from the other plate 28 to position the wheels 35 within the guideway channel 33 of the I-beam 19. The upper lifting member 25 also includes a fork comprising a pair of L-shaped arms 38, 39 spaced laterally at opposite ends of the upper carriage and having vertically extending supporting portions 40, 41 secured to the back of the front plate 31 at opposite ends thereof, respectively, and to the block 29, 30, respectively.

The lower lifting member 26 comprises a pair of laterally spaced fore and aft extending lifting arms 45, 46 disposed beneath the lifting arms 38, 39 of the upper member 25, respectively, and having rear end portions 47, 48, which are bent upwardly and extend to a height appreciably above the upper ends of the vertical portions 40, 41 of the upper arms 38, 39, respectively. The two vertical supporting portions 47, 48 are interconnected by a transverse tie plate 49 rigidly connected thereto. A pair of carriage side plates 52, 53 are rigidly secured to the outer sides of the arm portitons 47, 48, respectively, by bolts 54 and are spaced outwardly from the vertical portions 47, 48 by means of spacer blocks 50, 51, respectively, to position the side plates 52, 53 on the outer sides of the I-beams 18, 19, respectively. The channels 55, 56 extending longitudinally on the outer sides of the I-beams 18, 19, respectively, serve as guideways for two pairs of vertically spaced wheels 57, 58. One pair of wheels 57 is journaled on trunnions 59 mounted on the side plate 52 and operates within the outer channel 55 of one of the vertical beams 18, while the other pair of vertically spaced wheels 58 is journaled on trunnions 59 mounted on the other side plate 53 to position the wheels 58 within the outer channel or guideway 56 in the I-beam 19.

Thus, it is evident that the upper fork arms 38, 39 are carried on the inner carriage plates 27, 28, which are supported on the wheels 34, 35 which engage the inner guide ways 32, 33, respectively, and thus can be raised and lowered relative to the upright frame 17 and relative to the lower lifting member 26. The lower arms 45, 46 of the lower lifting member 26 are carried on the outer side plates 52, 53, which are supported in the outer wheels 57, 58 which travel in the outer guide ways 55, 56 of the I-beams 18, 19, respectively, and thus the lower member 26 is shiftable vertically relative to the upright frame 17 and to the upper lifting member 25.

Both the upper and lower lifting members 25, 26 are raised and lowered by means of a power actuated lifting device in the form of a hydraulic cylinder 65 disposed in a vertical position midway between the two vertical I-beams 18, 19 of the upright frame 17. The lower end of the cylinder 65 is mounted on a support 66 on a portion of the truck frame 12 and has a piston 67 slidable vertically within the cylinder 65. The piston 67 is mounted on a piston rod 68, which extends upwardly through an opening 69 in the upper end of the cylinder, through which the rod 68 is slidable. The upper end of the rod 68 carries a journal bearing 70, within which is journaled a transverse jackshaft 71, which is provided with guide wheels 72, 73 journaled on opposite ends thereof, respectively. The wheels 72, 73 engage the vertical guideways 32, 33 along the inner sides of the I-beams 18, 19, respectively. A pair of sprockets 74, 75 are rigidly fixed to the jackshaft 71 in laterally spaced relation on opposite sides of the hydraulic cylinder 65 and a pair of lifting chains 76, 77 are trained over the sprockets 74, 75, respectively, and have one end of each chain connected to brackets 78, 79, which are fixed to a transverse bracing member 80 which is secured to the two arms 40, 41, respectively. The other ends of the chains 76, 77 are secured to the transverse bracing member 21, fixed to the two upright beams 18, 19.

Hydraulic fluid is introduced to the bottom of the cylinder 65 through a hose connection 81 (see Figure 2). The hydraulic control equipment for forcing the fluid into the cylinder is controlled from the operator's station 16 and is not described herein for it is to be understood that any suitable conventional hydraulic mechanism can be used. When fluid is forced under pressure through the connection 81 into the cylinder 65, the piston 67 is forced upwardly therein, thereby raising the transverse shaft 71. Since the rear ends of the chains 76, 77 are anchored in fixed relation to the transverse bar 21, raising the bar 71 has the effect of raising the upper carriage and lifting member 25 through the connections of the forward ends of the chains to the brackets 78, 79. The upper member 25 is thus raised at a speed which is twice the speed of the upward movement of the jackshaft 71.

The lower lifting member 26 is raised through a pair of inwardly projecting shoulders 85, 86 near the upper ends of the vertical portions 47, 48, respectively, of the L-shaped arms 45, 46. The shoulders 85, 86 engage a pair of outwardly projecting blocks 87, 88, which are rigidly secured to the outer sides of the carriage plates 27, 28, respectively.

The operation of the lifting mechanism is as follows. Normally, the two lifting forks are disposed in nested relation on the truck frame 12. When fluid is forced into the cylinder 65 below the piston 67, the latter moves upwardly, carrying the jackshaft 71 in the journal bearing 70 and raising the upper fork 25 independently of the lower fork 26 until the blocks 87, 88 engage the shoulders 85, 86 on the lower fork member 26, after which, further upward movement of the piston 67 in the cylinder 65 causes both lifting members 25, 26 to be raised simultaneously to the upper end of the upright frame 17. The limit of upward movement of the lifting members is determined by the plates 27, 28 engaging the transverse members 20 across the top of the frame 17.

One use for a truck of this type is illustrated in Figures 1, 4, 5 and 6, in which the truck is used to lift the trays 90, 91 containing castings, indicated at 92, from a roller type conveyor 93. The conveyor 93 comprises a pair of laterally spaced structural members 94, 95 interconnected by suitable transverse structural members 96, 97 and carried on vertical supporting legs 98. A plurality of rollers 99 are disposed transversely between the frame members 94, 95 and are rotatably supported at opposite ends, respectively, on the latter. The conveyor 93 is of the gravity type and is inclined to cause the trays 90, 91 to roll over the rollers 99 until they engage the transverse end member 97 which serves as a stop. The legs 98 are spaced forwardly from the end of the conveyor to permit the truck to drive under the latter with the arms of the lifting forks spaced laterally from the side members 94, 95 of the conveyor, respectively.

The hydraulic cylinder is then actuated to raise the upper fork or lifting member 25 to engage the upper arms 38, 39 with the first tray 90 and to raise the latter until the blocks 87, 88 engage the shoulders 85, 86 on the lower fork 26. Further lifting movement of the hydraulic mechanism causes the upper fork 25 to raise the upper tray and also to raise the lower fork 26 by the shoulders 85, 86 into a position in which the lower arms 45, 46 pick up the second tray 91 which, in the meantime, has been moved along the conveyor 93 to the end of the latter, as indicated in Figure 5. The hydraulic cylinder can then be actuated to raise both trays 90, 91 to their upper limits of movement, to the position shown in Figure 6 in which the trays are transported to their destination.

By lowering the piston 67 in the cylinder 65, the trays can be set down at any suitable location in the reverse order. The lower tray 91 is first set upon a table or conveyor, after which further downward movement of the upper lifting member 25 brings the lower fork 26 to rest upon the frame 12, after which the upper fork 25 can be lowered away from the shoulders 85, 86 of the lower fork 26 to set the upper tray 90 upon the conveyor.

It will be noted that the blocks 87, 88 and the cooperating shoulders 85, 86 constitute a lost motion connection between the upper and lower lifting members 25, 26.

Referring now more particularly to Figures 7-10, inclusive, the modified form of my invention is in most respects similar in construction to the embodiment described above, and therefore a complete description of the modified form is not deemed to be necessary, but similar parts are indicated by similar reference numerals in the two embodiments.

The embodiment shown in Figures 7-10 is similar to the embodiment shown in Figures 1-6 in so far as the construction of the upper and lower lifting members 25, 26 is concerned, except that the lost motion connection between the two members is omitted, thereby permitting the upper fork member 25 to be raised to the top of the upright guide frame 17 independent of the lower fork member 26. The vertical portions 47', 48' of the lower L-shaped lifting arms 45, 46 terminate in the plane of the ends of the vertical portions 40, 41 of the upper fork member, and the blocks 87, 88 are omitted entirely from this embodiment.

The difference between the two embodiments lies in the power actuated lifting mechanism for the two upper and lower forks. The lower lifting member 26 is raised and lowered in the guide frame 17 by means of a power actuated lifting device 105 in the form of a hydraulic cylinder disposed in a vertical position substantially centrally of the truck frame 12 and between the two upright I-beams 18, 19 of the guide frame 17, while the upper fork member 25 is raised and lowered by a second hydraulic cylinder 106 disposed in a vertical position directly behind the cylinder 105 and carried on the truck frame 12. The forward cylinder 105 is provided with a piston rod 107 which carries at its upper end a journal bearing 108, in which is journaled a rotatable shaft 109 extending transversely between the upright I-beams 18, 19 and having at its opposite ends a pair of guide wheels 110, 111, respectively. The guide wheels 110, 111 travel along the channels 32, 33 of the I-beams 18, 19, respectively, the channels serving as guideways to maintain the shaft 109 in its transverse position. The shaft 109 is provided with a pair of laterally spaced sprockets 112, 113, rigidly fixed thereto adjacent the guide wheels 110, 111, respectively. A pair of lifting chains 114, 115 are trained over the laterally spaced sprockets 112, 113 and are connected at their rear ends to the transverse frame member 21 and at their forward ends to the transverse tie beam 49 on the lower fork member 26.

The rear cylinder 106 has a piston rod 120, which is provided with a journal bearing 121 in which a transverse shaft 122 is journaled. An upright guide frame 123 is disposed behind the guide frame 17 and comprises a pair of laterally spaced channel beams 124, 125 disposed substantially vertically on opposite sides of the cylinder 106, respectively, with their channel portions 126, 127 turned inwardly. The beams 124, 125 are interconnected by a plate 128 between the upper ends thereof and are also connected with the upper transverse member 20 of the front guide frame 17 by connecting plates 129. The transverse shaft 122 is provided at opposite ends, respectively, with a pair of guide wheels 130 which operate in the channels 126, 127 of the guide frame 123. A pair of laterally spaced, generally triangular carriage side plates 135, 136 are mounted on the transverse shaft 122 and are interconnected by a second shaft 137 disposed directly above the shaft 122. A pair of guide wheels 138, 139 are journaled on opposite ends, respectively, of the shaft 137 and travel in the guideways 126, 127 provided by the channels in the channel members 124, 125, respectively.

Thus, it will be evident that the side plates 135, 136 are interconnected by the shafts 122, 137 to form a rigid carriage frame which is mounted on the pair of lower wheels 130 and the pair of upper wheels 138, 139, which travel in the guideways 126, 127. The triangular side plates 135, 136 overhang the cylinder 105 and are interconnected by a journal bearing 140 at their forward ends. A transverse shaft 141 is journaled in the bearing 140 and extends outwardly beyond the two side plates 135, 136 to support a pair of laterally spaced sprockets 145, 146. A pair of chains 147, 148 are trained over the sprockets 145, 146, respectively, and are anchored at their rear ends on the transverse frame member 21. The forward ends of the chains 147, 148 are connected to the transverse carriage frame member 80 on the upper fork 25.

The operation of this embodiment of my invention is explained as follows. The upper fork 25 is raised by introducing hydraulic fluid under pressure through a hose connection 149 in the lower end of the rear cylinder 106, thereby forcing the piston and piston rod 120 upwardly in the cylinder 106, which raises the carriage side plates 136 on their supporting wheels in the guideways 126, 127, thereby raising the shaft 141 and the lifting chains 147, 148 which are connected to the upper fork 25. In this manner the upper fork 25 can be lifted to the upper end of the upright guide frame 17, independent of the lower fork 26. The lower fork 26 can be raised by introducing hydraulic fluid under pressure through a hose connection 150 in the lower end of the forward cylinder 105, thereby forcing the piston rod 107 upwardly, carrying with it the transverse shaft 109 and the chains 114, 115 which are connected to the lower fork. The hydraulic control mechanism is not shown nor described here, but it is to be understood that any suitable conventional mechanism may be used which will control the two cylinders 105, 106 independently of one another. Obviously, however, the upper fork 25 must be raised before the lower fork is raised, since in this embodiment the forks are not designed to pass one another on the guide frame, although it is to be understood that my invention is not to be limited to the particular details shown and described herein, except as set forth in the claims which follow. Furthermore, it is to be understood that my invention is not limited to a truck having only two lifting members or forks, for it is considered to be within the scope of my invention to provide any reasonable number of vertically shiftable members on a truck.

I claim:

1. In an industrial truck, a guide frame comprising a pair of laterally spaced upright beams provided with guideways extending longitudinally along the inner and outer sides thereof, respectively, a first carriage shiftable vertically along said frame and having wheels at opposite sides thereof engaging one guideway in each of said beams, a second carriage shiftable vertically along said frame and having wheels at opposite sides thereof engaging the other guideway in each of said beams, power actuated lifting means connected with said first carriage for raising the latter to a predetermined height independent of said second carriage, and a part associated with said second carriage and extending upwardly therefrom and adapted to be engaged by said first carriage when the latter reaches said predetermined height, thereby causing both carriages to be raised simultaneously by raising said first carriage above said predetermined height.

2. In an industrial truck, a guide frame comprising a pair of laterally spaced upright beams provided with guideways extending longitudinally along the inner and outer sides thereof, respectively, a first carriage shiftable vertically along said frame and having wheels at opposite sides thereof engaging one guideway in each of said beams, a second carriage shiftable vertically along said frame and having wheels at opposite sides thereof engaging the other guideway in each of said beams, and a pair of independently operable power actuated lifting devices connected to said carriages, respectively, for shifting the latter relative to said frame.

3. In an industrial truck, a guide frame comprising a pair of laterally spaced upright beams, a pair of upper and lower load carrying members mounted on said frame by means providing for vertical shifting movement of each member relative to said frame and to the other member, a first power actuated lifting device disposed between said beams and connected to said lower member for raising and lowering the latter, and a second power actuated lifting device disposed behind said first device and having a part overhanging the latter and connected with said upper member for raising and lowering the latter.

4. In an industrial truck, a guide frame comprising a pair of laterally spaced upright beams provided with guideways extending longitudinally along the inner and outer sides thereof, respectively, a first carriage shiftable vertically along said frame and having wheels at opposite sides thereof engaging one guideway in each of said beams, a second carriage shiftable vertically along said frame and having wheels at opposite sides thereof engaging the other guideway in each of said beams, a first power actuated lifting device disposed between said beams and connected to one of said carriages for raising and lowering the latter, and a second power actuated lifting device disposed behind said first device and having a part overhanging the latter and connected with the other of said carriages for raising and lowering the latter.

5. In an industrial truck, a guide frame comprising a pair of laterally spaced upright beams provided with guideways extending longitudinally along the inner and outer sides thereof, respectively, a first carriage shiftable vertically along said frame and having wheels at opposite sides thereof engaging said guideways on the outer sides of said beams, respectively, a second carriage shiftable vertically along said frame and having wheels at opposite sides thereof engaging said guideways on the inner sides of said beams, respectively, a first power actuated lifting device disposed between said beams and including a vertically shiftable shaft extending transversely between the latter and having guide wheels mounted thereon and engaging the guideways on the inner sides of said beams, sprockets on said shaft, chains trained over said sprockets and connected with said first carriage, a second power actuated lifting device disposed behind said first device and including a vertically shiftable frame overhanging said shaft, a second shaft mounted in said frame and having sprockets mounted thereon, and chains trained over the last mentioned sprockets and attached to said second carriage.

6. In an industrial truck: a guide frame including a pair of upright beams, spaced apart and having vertical guideways; a transverse member having portions respectively slidably carried in said guideways; a pair of carriages arranged for vertical movement relative to the guide frame and for vertical movement relative to each other; means on one of said carriages including a transverse member normally positioned below the aforesaid transverse member and having opposite end portions respectively slidably carried in the guideways; means for raising and lowering one of the carriages at least to a limited extent irrespective of the other, including a vertically extensible and contractible device extending vertically between the beams and generally in the transverse vertical plane of the beams, means anchoring one end of the device to the guide frame, means connecting the other end of the device to the first transverse member, and means connecting the first transverse member to the second transverse member; means slidably supporting the other carriage on the guide frame for vertical movement; and means for raising and lowering said other carriage.

7. The invention defined in claim 6, further characterized in that: the beams are channel members with the open sides of the channels facing each other to provide the guideways; the transverse members have end portions slidable vertically in the channels; and the extensible and contractible device is a fluid-pressure cylinder and piston assembly.

8. The invention defined in claim 6, further characterized in that: the beams are I-beams having inner and outer vertical channels, respectively, with the inner channels providing inner guideways and the outer channels providing outer guideways; the transverse members have end portions slidable vertically in the inner guideways; and the means slidably supporting the other carriage on the guide frame includes portions connected to said other carriage and received respectively by the outer guideways.

NATHAN LESSER.

REFERENCES CITED

The following references are of record in the file of this patent:

UNITED STATES PATENTS

| Number | Name | Date |
|---|---|---|
| 1,297,619 | Wessmann | Mar. 18, 1919 |
| 1,487,571 | Hurwitz | Mar. 18, 1924 |
| 2,306,713 | Prucha | Dec. 29, 1942 |

FOREIGN PATENTS

| Number | Country | Date |
|---|---|---|
| 526,063 | Great Britain | Sept. 10, 1940 |